United States Patent [19]

Lan

[11] Patent Number: 4,756,497
[45] Date of Patent: Jul. 12, 1988

[54] NON-TURNOVER BASE DEVICE

[76] Inventor: Yung-Huei Lan, 3F., No. 32, Lane 61, Han-Chuo S. Rd., Sec. 2, Taipei, Taiwan

[21] Appl. No.: 904,914

[22] Filed: Sep. 8, 1986

[51] Int. Cl.⁴ ............................................. F16B 47/00
[52] U.S. Cl. ............................ 248/205.9; 220/85 H; 248/311.2; 248/346.1; D7/70
[58] Field of Search ............... 248/346.1, 346, 311.2, 248/309.3, 205.8, 205.9; D7/70; 220/85 R, 85 H

[56] References Cited

U.S. PATENT DOCUMENTS

| | | | |
|---|---|---|---|
| 479,092 | 7/1892 | Julian | 248/205.9 X |
| 930,236 | 8/1909 | Schacht | 248/205.9 X |
| 2,565,793 | 8/1951 | Weismantel | 248/205.9 X |
| 2,642,248 | 6/1953 | Semon | 248/205.9 |
| 2,871,615 | 2/1959 | Borah | 248/346.1 |
| 2,963,256 | 12/1960 | Borah | 248/346.1 |
| 2,968,888 | 1/1961 | Borah | D7/70 X |

Primary Examiner—David L. Talbott

[57] ABSTRACT

As a result of the torsional force, a cup, a bottle, or a jar is susceptible to turnover upon being rammed. Usually, an upward force has no torsional force, and therefore would not cause a vessel or the like to turn over. Therefore, a cupule may be used as a supporting base to be place on a table surface, and a retractable cylinder assembly may be used for resisting a torsional force by properly connecting the inner cylinder and the outer cylinder in the aforesaid retractable cylinder assembly; further, the cupule is furnished with a through hole, which is covered with a cap, and the cap can open or close the through hole by means of a function generated by the retractable cylinder assembly so as to control the suction or release of the cupule. By adding some suitable mechanical structure, a supported object attached to the base device would not be turned over upon being rammed, but it can be easily removed from the table surface by lifting upwards.

7 Claims, 2 Drawing Sheets 4,756,497

NON-TURNOVER BASE DEVICE

BACKGROUND OF THE INVENTION

It is often happened that a cup, or a battle, or a jar is susceptible to turnover upon being rammed. In order to solve the afore-said problem, the inventor has developed a non-turnover base, which is to be attached under a cup, a battle or a jar, etc., and which had been filed on Jan. 13, 1986 with Ser. No. 06/818,368 as a patent application. Subsequently, the inventor has developed an improvement to the invention so as to improve the thickness of the structure, to improve the manufacture tolerance, and to reduce its parts and assemblies in order to lower the manufacturing costs to be improved over such an earlier application.

SUMMARY OF THE INVENTION

This invention relates to a cupule to be mounted under a cup or other supported objects. Between the cupule and the cup or the like, a suitable retractable mechanism is provided; the retractable mechanism may be a retractable cylinder, or may be a ligament being connected between the cupule and the cup so as to provide a retractable function between the cup or other supported objects and the cupule. The cupule is furnished with a suitable through hole, which is covered with a cap being connected with the cup or other supported objects. Upon the retractable mechanism being stretched nearing its limit, the cap will be opened to let the air enterring into the cupule and to release the vacuum of the cupule; then, the cup or the like can he lifted up from a table surface. Upon the cup or other supported object being rammed from one side by a considerable force, the retractable mechanism will be inclined at a tolerable angle as designed and the cup can be lifted in a limited distance so that the cupule is still attached to the table surface to prevent turning over of the cup.

DETAILED DESCRIPTION

Figure 1:
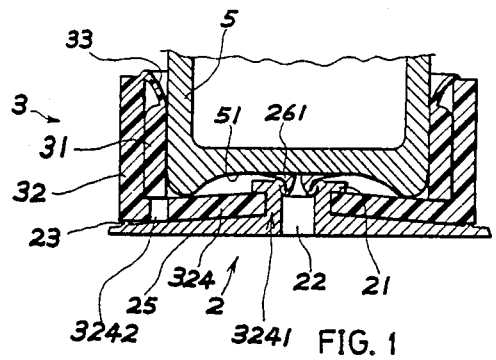
FIG. 1 is a sectional view of the present invention when placed on a table surface.
Figure 2:
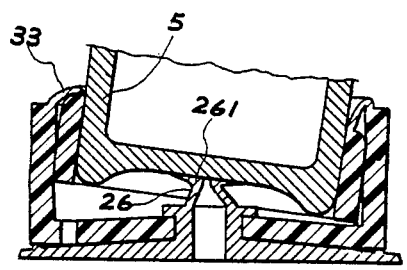
FIG. 2 is a sectional view of the present invention when pushed rightwardly.
Figure 3:
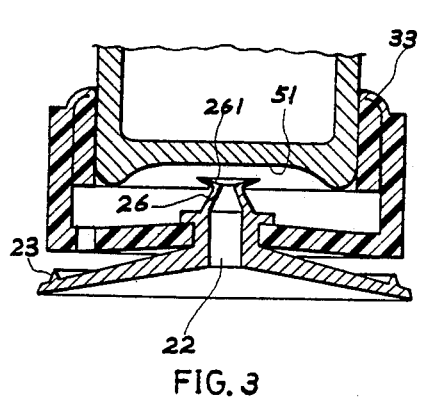
FIG. 3 is a sectional view of the present invention when a supported object such as a cup is lifted upwardly to release a cupule.

The present invention is shown in FIGS. 1-6. FIG. 1 shows a preferred embodiment of the present invention as being placed on a table surface, in which there is a ligament 33 being furnished between the inner cylinder 31 and the outer cylinder 32 of the retractable cylinder assembly 3. The ligament 33 is a ring-shaped member a round and between the inner and the outer cylinders. The cup 5 is tightly inserted in the inner cylinder 31; the hook flange 21 of the cupule 2 hooks up with the edge portion of the central hole 3241 of the bottom plate 324. The bottom plate 324 is furnished with a venthole 3242 so as to facilitate the extension operation of the retractable cylinder assembly 3 and to let the air enter into the through hole 22 of the cupule 2. On the top of the through hole 22, there is a retractable conic air valve 26 (as shown in FIG. 3), which is mounted around with a small cupule 261. Upon the whole device being placed on a table surface, the cup bottom 51 will be pressed on the small cupule 261 to close the air valve 26 and to press it to a flat condition; in that case, the cupule 2 will also be pressed and attached firmly on a table surface, and the round cupule flange 23 on the back side of the cupule will also be pressed to have the edge portion of the cupule closely and airtightly attached to the table surface. Upon the cup 5 being rammed from the left side thereof as shown in FIG. 10, the cup will be inclined towards one side as a result of the deformation of space between the inner cylinder 31 and the outer cylinder 32, and the material of the parts. When the cup inclines to the extent as shown in FIG. 2, the left side ligament 33 will be pulled to its limit, and the cup will not incline further; it is deemed an acceptable inclination to the device. In that case, the small cupule 261 in the center of the extractable cylinder assembly 3 is still closely attached to the cup bottom 51, and the air valve 26 has been pulled in an elongated condition; since the through hole 22 is still in closed condition, the cupule remains being attached to the table surface. Upon the cup being lifted upwards as shown in FIG. 3, the inner cylinder 31 will be lifted up to its limit as well as the ligament 33; the cup bottom 51 has also been lifted up to a sufficient height that can cause the small cupule 261 to be separated from the cup bottom. The air will enter into the space between the cupule and the table surface via the venthole 3242, the conic air valve 26, and the through hole 22 to have the cupule released, and the cup lifted up.

Figure 4:
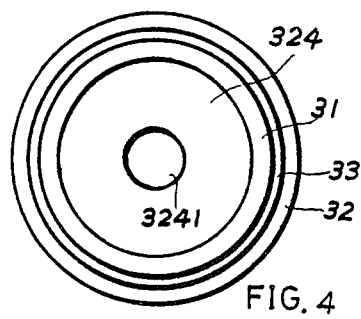
FIG. 4 is a top view showing a retractable cylinder assembly of the present invention by integrally forming an inner cylinder and an outer cylinder.
Figure 5:
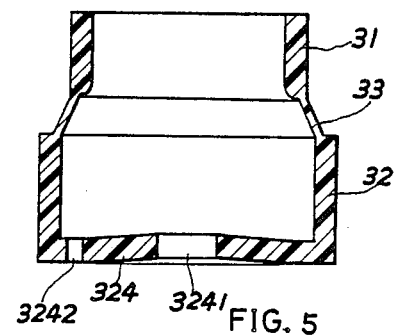
FIG. 5 is a side-sectional view of the retractable cylinder assembly as shown in FIG. 4.

In FIGS. 4 and 5, a retractable cylinder assembly 3 includes an inner cylinder 31, an outer cylinder 32 and a ligament 33, which are made of a plastic material or a rubber, and moulded integrally into one piece; then, the inner cylinder 31 is pulled out as shown in FIGS. 1-3, since the material is flexible and transformable.

Figure 6:
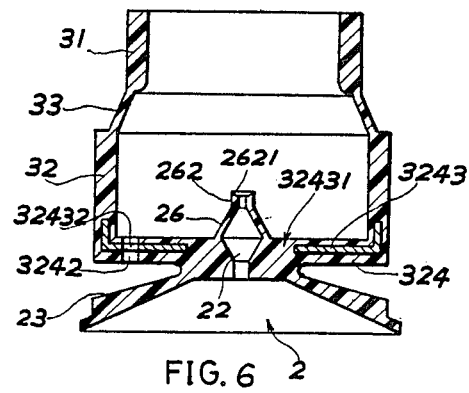
FIG. 6 shows an inner cylinder intended to be retracted into the outer cylinder integrally formed with the inner cylinder in accordance with the present invention.

The base body of the present invention can be made of a suitable material to be integrally moulded into one piece as shown in FIG. 6. In order to make the outer cylinder 32 and its bottom plate having sufficient strength, a metal vessel 3243 of the similar shape may be inserted; the vessel 3243 has a central hole 32431 and a venthole 32432 on the edge portion so as to facilitate the manufacturing process. The air valve 26 may only have a valve head 262 without having a small cupule; instead, the top edge of the valve head is furnished with a soft salient part 2621 so as to have a close contact with the cup bottom. The material for the salient part 2621 should have a suitable elasticity so as to have the valve head and the cup bottom closely contacted when the cap is inclined or lifted up, but before the lifting distance of the bottom center of the cup is less than the lifting limit distance of the air valve, since the valve head has an upward elasticity and the cup bottom can still maintain in a close and airtight contact condition. The through hole 22 may be formed into a hopper shape as shown in FIG. 6. Upon the cupule 2 being pressed on a table surface, the valve head will be pressed into the hopper-shaped space over the through hole 22 to reduce the space and air left therein so as to have the cupule had a better suction force. The round cupule flange 23 on the back side thereof may be changed into other suitable shape so as to facilitate its mold releasing.

The inner cylinder 31 may be replaced with the lower part of a tubular cup, which can not be formed integrally together with the base body, but the ligament 33 may be glued or welded to the lower portion of the cup so as to have the cup connected together with the base body.

Figure 7:
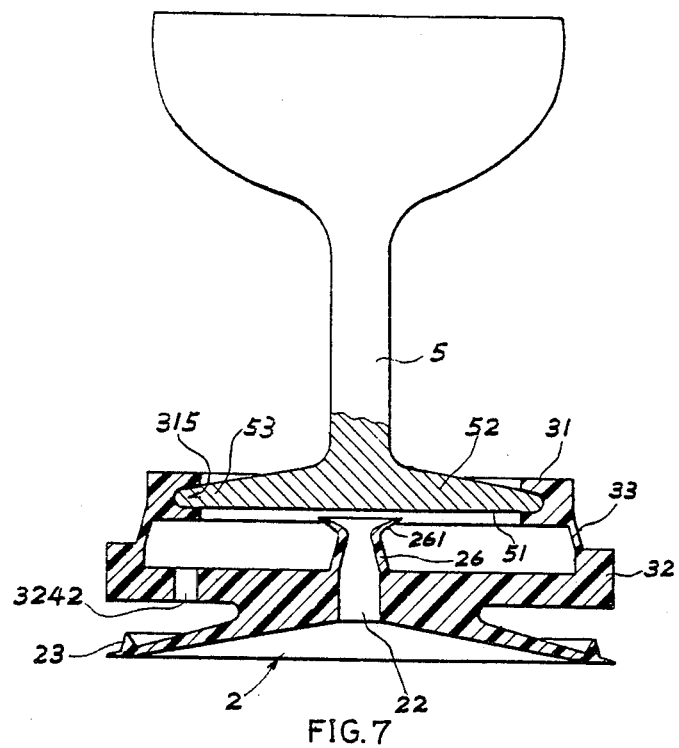
FIG. 7 is a sectional view of a shallow retractable cylinder assembly of the present invention wherein the inner and outer cylinders are each formed to resemble a ring.

The inside of the inner cylinder 31 is furnished with a round groove 315 as shown in FIG. 7. The round groove is fastened around the edge portion 53 of the discshaped foot 52 under the lower portion of the cup 5, being connected together with the cup. The using method is the same as that described above; the cup bottom 51 covers on the small cupule 261 so as to close the air valve 26, and let the cupule 2 attach on a table surface. The cup would not be turned over by means of the inner and outer cylinders 31 and 32, and the ligament 33. Upon lifting the cup bottom 51 to an extent of being disengaged from the small cupule 261, the vacuum of cupule 2 will be released and the cup can be lifted up easily. In FIG. 7, the height of the inner and outer cylinders 31 and 32 is rather low, being substantially a ring, but their function is the same as that mentioned above.

Figure 8:
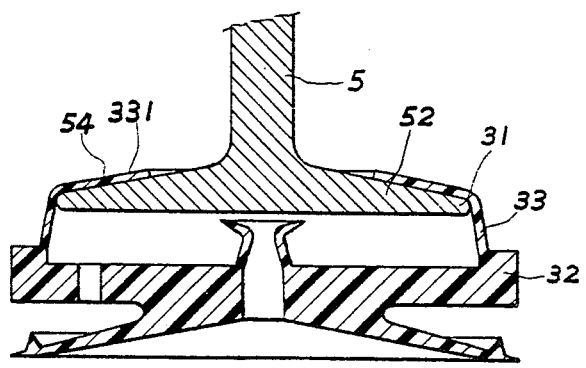
FIG. 8 is a sectional view of the present invention wherein the inner cylinder is not a cylinder and partially embedded with an edge of a disc-shaped foot of a cup.

The inner cylinder 31 may be formed by means of the edge of the discshaped foot 52 of the cup as shown in FIG. 8. The shape of that inner cylinder looks different from that in the aforesaid embodiment, but its function is the same. The upper portion 331 of the ligament 33 is adhered with glue to the top surface 54 of the discshaped foot 52. However, the other parts and the use of this base device are the same as that shown in FIG. 7. Reference may be made to FIG. 7 if necessary. In order to maintain a suitable space between the cupule and the table surface so as to allow the cupule being quickly released when enterring air through the hole 22, a plurality of ribs are radially disposed around the throught hole on the bottom surface of the cupule 2 (not shown).

What is claimed is:

1. A non-turnover base device comprising: a cupule formed with a through hole on its central portion, a retractable air valve mounted on the upper portion of the through hole of said cupule, a retractable cylinder assembly including an inner and an outer cylinders, of which one is sleeved over the other, and a ligament member secured between said two cylinders; and wherein said inner cylinder of said retractable cylinder assembly is retractable within said outer cylinder, and the lower portion of said retractable cylinder assembly is connected with a cupule, of which the upper portion is connected with a supported object; and said air valve is closed with the bottom of the supported object; whereby when said device is placed on a table surface, said retractable cylinder assembly becomes retracted, and the bottom surface of the supported object closes said air valve and causes said cupule to be attached to the table surface; and when said supported object is impacted, said supported object is limited from being lifted upwardly by means of said ligament between said inner cylinder and said outer cylinder, while the retractility of the air valve is still in contact with the bottom of the supported object; and when the supported object is lifted upwards to cause the said retractable cylinder assembly to stretch to a sufficient distance to allow the bottom of the supported object to be separated from the stretched air valve, and allow air to enter into said cupule through said air valve, so that the supported object can be lifted easily.

2. A non-turnover base device as claimed in claim 1, wherein said inner and outer cylinders of said retractable cylinder assembly and said ligament are molded integrally into one piece, and said inner cylinder is retractable into said outer cylinder.

3. A non-turnover base device as claimed in claim 1, wherein said inner cylinder of said retractable cylinder assembly is secured with a supported object as a cup.

4. A non-turnover base device as claimed in claim 1, wherein said retractable soft air valve is formed as a conic shape, and the upper end of said air valve is airtightly clasped by the bottom of a supported object, and is self retractable upon being pressed axially.

5. A non-turnover base device as claimed in claim 1, wherein the circumferential edge of said stretchable air valve is furnished with a cupule attachable to the bottom of a supported object.

6. A non-turnover base device as claimed in claim 1, wherein the back side edge of said cupule is furnished with a round flange, whereby the edge portion of said cupule can be in close contact with the table surface when said cupule is pressed by the whole device and the supported object.

7. A non-turnover base device as claimed in claim 1, wherein the bottom surface of said cupule is furnished with a plurality of ribs radially disposed around said through hole of said cupule so as to maintain a suitable space between said cupule and the table surface.

* * * * *